3,650,975
RARE EARTH OXIDE PHOSPHORS CONTAINING
ALKALI METAL SILICATES AND GERMANATES
Ramon L. Yale, Ulster, Pa., assignor to Sylvania
Electric Products Inc.
No Drawing. Filed Oct. 31, 1969, Ser. No. 873,067
Int. Cl. C09k 1/10, 1/54
U.S. Cl. 252—301.4 F        9 Claims

ABSTRACT OF THE DISCLOSURE

A new phosphor composition having increased brightness is disclosed that consists essentially of a rare earth oxide host material having a europium activator and specific amounts of an ion selected from the group consisting of silicate, germanate and mixtures thereof and specific amounts of alkali metal ions selected from the group consisting of lithium, sodium, and mixtures thereof. A process for producing the new phosphors and for controlling the particle size thereof, comprises incorporating an alkali metal compound selected from the group consisting of lithium silicate, lithium germanate and mixtures thereof with the appropriate rare earth oxalate and subjecting the mixture to a two step heating process.

BACKGROUND OF THE INVENTION

It has been known for an appreciable period of time that the rare earth oxide phosphors, particularly yttrium oxide, gadolinium oxide and mixed yttrium-gadolinium oxide phosphors, are extremely bright red-emitting phosphors. Their use, however, has been limited due to problems in getting the phosphor deposited on a viewing screen in a manner that does not lower the intrinsic brightness of the phosphor. An additional problem with the foregoing oxide phosphors is that it is difficult to control the particle size of the phosphor. Different particle size phosphors are desired depending upon the technique used to deposit the phosphors upon the viewing screen. For example, when the "slurry" technique is used, smaller particles are desired than when the "dusting" technique is used. A few additives are known that will control the particle size of the phosphor; however, in many instances the amount required to control the particle size is higher than desired or the brightness of the phosphor is diminished or remains the same.

It is believed that a process that controls the particle size and provides a new phosphor composition having an increased brightness is an advancement in the art.

SUMMARY OF THE INVENTION

In accordance with one aspect of this invention there is provided a new phosphor composition consisting essentially of a rare earth oxide host material, from about 0.01 mole to about 0.1 mole of europium per mole of the host material, from about 0.05% to about 2.0% by weight of an ion selected from the group consisting of silicate, germanate and mixtures thereof and from about 0.01% to about 0.3% by weight of an alkali metal ion selected from the group consisting of lithium, sodium and mixtures thereof.

In accordance with another aspect of this invention there is provided a process for preparing the improved phosphor comprising the steps of (a) Forming a substantially uniform mixture of a corresponding rare earth oxalate and from about 0.1% to about 2.5% by weight of an alkali metal compound selected from the group consisting of lithium silicate, lithium germanate, sodium germanate and mixtures thereof, (b) Heating the mixture to at least about 900° C. for at least about one hour, (c) Cooling the resultant mixture to at least about 100° C., (d) Subjecting the cooled mixture to sufficient agitation to form a relatively homogeneous mixture, (e) Heating the mixture from about 1100° C. to about 1300° C. and contacting the resulting rare earth oxide phosphor composition with sufficient water to yield a product having a pH that is essentially neutral.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

In the process of this invention a rare earth oxalate that can contain a source of the activator, europium, is mixed with from about 0.1% to about 2.5% by weight of an alkali metal compound selected from the group consisting of lithium silicate, lithium germanate, sodium germanate and mixtures thereof; of these alkali metal compounds lithium silicate and lithium germanate are preferred and lithium silicate is especially preferred.

Although some brightness increase is achieved with as little as about 0.1% of the alkali metal compounds, higher amounts up to about 0.5% yield additional brightness increases when the lithium compounds are used. When sodium germanate is used, more sodium germanate is required to yield a given brightness increase than if the lithium compounds are used. For example, it has been found that up to about 0.8% sodium germanate is required to yield the same brightness increase that is attained with a 0.4% lithium germanate. Brightness increases level off at about 0.5% by weight of the lithium compounds and at about 0.8% by weight of the sodium germanate. In many instances it can be desired to use more of the alkali metal compounds than is required to yield maximum brightness because the amount of the alkali metal compound that is used is related to the particle size of the resulting phosphor, that is, the larger the amount of alkali metal compound the larger the particle size of the phosphor within the 0.1% to 2.5% range. Amounts above about 2.5% are not to be used because there is no increase in brightness over lesser amounts and amounts above about 2.5% by weight do not increase the particle size. The foregoing percentages by weight are based on the weight of the rare earth oxide.

As heretofore mentioned the rare earth oxides that are used are yttrium oxide, gadolinium oxide and the mixed yttrium-gadolinium oxide. The oxides are activated by europium and generally about 5 molar percent of europium yields phosphors having the best brightness, color and body color. In most instances europium will be added to the solution of yttrium or gadolinium that is formed before the yttrium or gadolinium is precipitated as an oxalate. In this manner, the europium also precipitates as an oxalate and is incorporated more uniformly than if the europium is added as a solid to the rare earth oxalates.

It is believed surprising that the lithium silicate, lithium germanate, sodium germanate and mixtures thereof yield the improved results since the other alkali metal silicates and germanates do not provide the benefits of this invention. Although it is not known with certainty why the use of the particular materials result in higher brightness and not wishing to be limited by the theory it is believed that the particular useful materials are more viscous in a liquid state, therefore, are incorporated more uniformly than less viscous materials.

After the relatively uniform mixture of the specific rare earth oxalates and the specific alkali metal compound is formed, the mixture is heated to a temperature of at least about 900° C. for at least about 1 hour. Although higher temperatures and longer times can be used, it is preferred to heat to a temperature as close to 900° C. as is possible and to discontinue heating after one hour. After the material has been at 900° C. for about 1 hour the mixture is cooled to a temperature of at least about 100° C. A temperature lower than about 100° C. can be used, however, cooling to a much lower temperature takes additional time and no significant benefits result.

After cooling sufficient agitation is employed to give a relatively homogeneous mixture. Any standard mixer used for blending or mixing dry solids can be used to provide the agitation. It has been found that it is necessary to blend the material after the initial heating step in order to attain a uniformity of the alkali metal compounds thorugh the host material.

After the mixing step is complete the materials are heated to a temperature of from about 1100° C. to about 1300° C. for at least about 2 hours. Longer times can be used, however, times in excess of about 6 hours are not generally required. The rare earth materials are converted to the oxides and the alkali metal compounds are melted and some disassociation of the alkali metal compound occurs. Some of the cation portion evolves from the material. In general, the higher the temperature the higher the loss of the cation portion. In most instances temperatures of about 1150 to 1250° C. are preferred and the amount of lithium in the phosphor is generally less than 0.01%. The silicate level, however, is generally at least about 0.3% when about 0.4% of the alkali metal compound is used. It has been found that when lithium silicate is used that particularly good results are achieved on yttrium oxide when it is heated to a temperature of from about 1175° C. to about 1225° C. using about 5% by weight of europium and about 0.3% by weight of the alkali metal compound.

After the material is heated to about 1100° C. to about 1300° C. it is contacted with sufficient water to yield a product having an essentially neutral pH. The washing step is necessary to insure that all by-products are removed to yield a phosphor having the higher brightness.

The compositions of this invention consist essentially of a rare earth oxide host selected from the group consisting of yttrium oxide, gadolinium oxide and mixtures thereof, from about 0.01 mole to about 0.1 mole of europium per mole of oxide as an activator and from about 0.05% to about 2.0% by weight, based on the oxide, of an ion selected from the group consisting of silicate, germanate, and mixtures thereof and from about 0.01% to about 0.3% by weight of an alkali metal selected from the group consisting of lithium, sodium and mixtures thereof.

As previously mentioned lithium silicate or lithium germanate are preferred and the corresponding preferred compositions contain from about 0.3% to about 0.6% silicate or germanate and from about 0.002% to about 0.015% lithium. Especially preferred are compositions containing yttrium oxide as the host from about 4.5 to about 5.5 mole percent europium, about 0.2% to about 0.4% by weight of silicate and from about 0.012% to about 0.015% by weight of lithium.

To more fully illustrate the invention the following detailed examples are presented. All parts, proportions, and percentages are by weight unless otherwise indicated.

Example I

About 44.5 parts of $(Y_{.955}Eu_{.045})_2(C_2O_4)_3$, which will produce about 20 parts of $(Y,Eu)_2O_3$, is blended with 0.1 part $Li_2GeO_3$. The flux concentration of lithium germanate is equivalent to about 0.5% of the resultant $(Y,Eu)_2O_3$. The blend is then heated in a furnace at about 900° C. for about 1 hour. The resultant rare earth oxide is cooled to about room temperature, reblended, and then heated for about 2 hours at about 1175° C. The resulting phosphor is milled sufficiently to enable all particles to pass through a 200 mesh screen and then contacted with sufficient deionized $H_2O$ at a temperature of about 75° C. to yield a product having a neutral pH. After drying at approximately 110° C., the material is screened using a 400 mesh screen. The material passing through the screen is suitable for application to a color television cathode ray picture tube.

For the purpose of comparison, phosphor without lithium germanate is prepared by essentially the same procedure. The phosphor containing the lithium germanate had a Fisher Sub-Sieve size of about 3.70 microns compared to about 2.90 microns for the phosphor without the germanate. The cathodoluminescence of a sample containing the germanate as measured in a demountable cathode ray tube at 12 kv., 6 μa. beam current, is about 18 percent brighter than the material without the germanate.

Example II

Example I is repeated with the exception that about 0.1 part or 0.5 percent $Li_2SiO_3$ is used. The resultant phosphor has a FSSS of about 4.25 microns and a cathodoluminescence increase of about 21 percent over the material without the lithium silicate.

Example III

Example I is repeated with the exception that 1.0 percent or 0.2 part $Na_2GeO_3$ is used. The resultant phosphor has a FSSS of about 3.80 microns and a cathodoluminescence increase of about 14 percent over the material without the germanate.

Example IV

The procedure of Example I is repeated except that about 49.8 parts gadolinium-yttrium europium oxalate is used to produce 25 parts of oxide of the formula $$[(Gd_{.85}Y_{.15})_{.955}Eu_{.045}]_2O_3$$

The corresponding oxalate is blended with about 0.063 part or 0.25 percent of $Li_2SiO_3$. The resultant phosphor has a FSSS of about 3.88 microns as compared to a control without the silicate of about 1.45 microns. Cathodoluminescence measurement shows an increase of about 16 percent over the control without the silicate.

Example V

The procedure of Example I is repeated except that about 50 parts of gadolinium europium oxalate is used to produce about 26.5 parts of oxide of the formula $(Gd_{.955}Eu_{.045})O_3$. The oxalate sample is blended with about 0.053 part or about 0.20 percent lithium metasilicate. The resultant phosphor has a FSSS of about 2.60 microns compared to a phosphor without the silicate of about 1.75 microns. Cathodoluminescence measurement shows an increase of about 7% over a control phosphor without the silicate.

Example VI

A series of phosphors are prepared using the procedure as given in Example 1 except that various amounts of lithium germanate are used and 5 mole percent of europium is used as an activator. Table I shows particle size and brightness of the resulting phosphor.

TABLE I

| Percent germanate | FSSS | Percent brightness cathode ray tubes |
|---|---|---|
| 0.0 | 2.90 | 145 |
| 0.1 | 2.95 | 145 |
| 0.2 | 3.80 | 155 |
| 0.3 | 5.15 | 168 |
| 0.4 | 5.70 | 170 |
| 0.5 | 5.80 | 172 |
| 0.6 | 6.10 | 165 |
| 0.7 | 6.00 | 164 |
| 0.8 | 6.10 | 166 |
| 0.9 | 6.20 | 168 |
| 1.0 | 6.30 | 169 |

The above data indicates that particle size is controlled and that the brightness is appreciably greater when lithium germanate is added.

Example VIII

The same procedure is followed as in Example VI except that varying quantities of lithium silicate are added. Particle size and cathode ray tube brightness are measured on samples of the phosphors. The results are shown below in Table II.

TABLE II

| Percent silicate | FSSS | Percent brightness cathode ray tube |
|---|---|---|
| 0.0 | 2.2 | 149 |
| 0.1 | 3.5 | 156 |
| 0.2 | 5.4 | 175 |
| 0.3 | 5.4 | 172 |
| 0.4 | 6.0 | 182 |
| 0.5 | 6.3 | 182 |
| 0.6 | 6.4 | 181 |
| 0.7 | 6.3 | 179 |
| 0.8 | 6.3 | 178 |
| 0.9 | 6.1 | 177 |
| 1.0 | 6.1 | 177 |

The above data indicate brightness is increased and particle size is controlled by the use of lithium silicate.

Example VIII

Following essentially the same procedure as in Example I except that sodium germanate at about 0.5% is used and the cathode ray brightness of the resulting phosphors is found to be increased about 9% (from about 137 to about 146). When the level of sodium germanate is increased to about 0.75% the cathode ray tube brightness is increased to about 168. Above about 0.75% a slight decrease in brightness is exhibited.

While there has been shown and described what are at present considered the preferred embodiments of the invention, it will be obvious to those skilled in the art that various changes and modifications may be made therein without departing from the scope of the invention as defined by the appended claims.

What is claimed is:
1. A process for preparing an improved cathodoluminescent rare earth oxide phosphor comprising the steps of
   (a) forming a substantially uniform mixture comprising rare earth oxalate selected from the group consisting of yttrium oxalate, gadolinium oxalate and mixtures thereof and from about 0.1% to about 2.5% by weight based on said oxalate of an alkali metal compound selected from the group consisting of lithium silicate, lithium germanate, sodium germanate and mixtures thereof,
   (b) heating said mixture to at least about 900° C. for about 1 hour,
   (c) cooling the resultant mixture to about room temperature,
   (d) subjecting the cooled mixture to sufficient agitation to form a relatively homogeneous mixture,
   (e) heating said homogeneous mixture to a temperature of from about 1100° C. to about 1300° C., for at least about 2 hours, and
   (f) contacting the resulting phosphor with a sufficient amount of water to yield an essentially neutral pH.
2. A process according to claim 1 wherein said alkali metal is lithium.
3. A process according to claim 2 wherein the amount of said lithium compound is from about 0.2% to about 0.5% by weight.
4. A process according to claim 3 wherein said homogeneous mixture is heated to a temperature of from about 1150° C. to about 1250° C.
5. A process according to claim 1 wherein said alkali metal compound is lithium silicate.
6. A phosphor composition consisting essentially of a rare earth oxide host material selected from the group consisting of yttrium oxide, gadolinium oxide and mixtures thereof, from about 0.01 mole to about 0.1 mole of europium per mole of said oxide as an activator and from about 0.1% to about 2.5% by weight, based on said rare earth oxide, of an alkali metal compound selected from the group consisting of lithium silicate, lithium germanate, sodium silicate, sodium germanate and mixtures thereof.
7. A composition according to claim 6 wherein said alkali metal compound is lithium silicate.
8. A composition according to claim 6 wherein said alkali metal compound is lithium germanate.
9. A composition according to claim 6 wherein said oxide is yttrium oxide, said europium is from about 4.5 to about 5.5 mole percent, and from about 0.2% to about 0.4% by weight of lithium silicate.

References Cited

UNITED STATES PATENTS 3,368,980  3/1968  Avella et al. _____ 252—301.4 R
3,458,451  7/1969  Kobayashi et al. __ 252—301.4 R ROBERT D. EDMONDS, Primary Examiner U.S. Cl. X.R.

252—301.4 R